May 24, 1932. H. C. WEBB 1,859,902
STOP-GO INDICATOR
Filed March 17, 1931
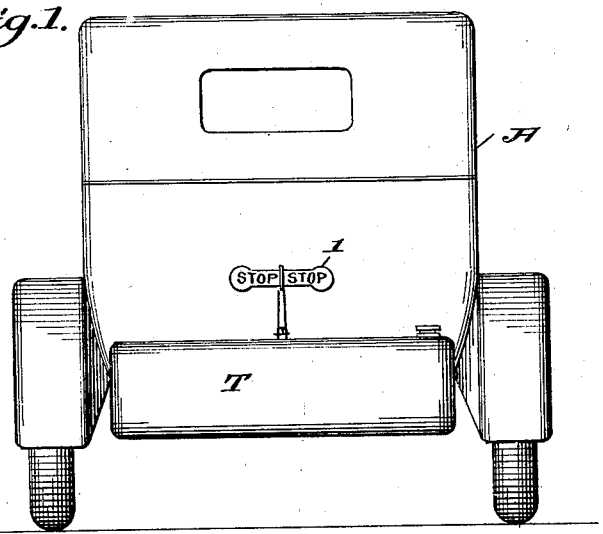
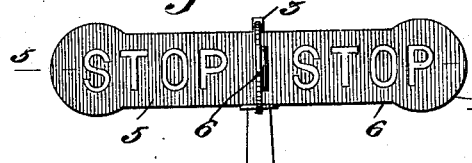
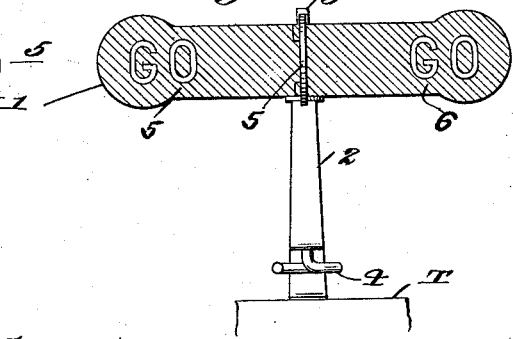
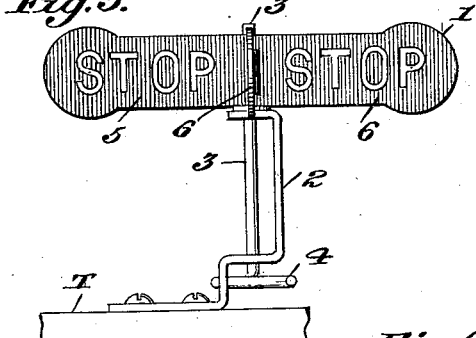
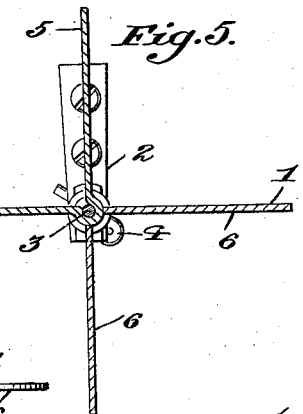
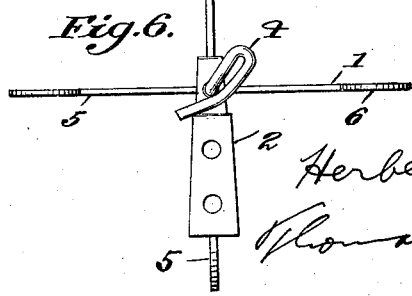
Inventor:
Herbert C. Webb
by
Thomas W. J. Clark
Atty.

Patented May 24, 1932

1,859,902

UNITED STATES PATENT OFFICE

HERBERT C. WEBB, OF BALTIMORE COUNTY, MARYLAND

STOP-GO INDICATOR

Application filed March 17, 1931. Serial No. 523,329.

My invention relates to a new and useful stop and go indicator for automobiles and other movable bodies in which changes of acceleration are imparted to the body, and the objects of my invention are to provide such an indicator which will accurately show the direction of acceleration, one which will be simple and economical to construct, one which will have few moving parts, and one which will be symmetrical in appearance, and thereby give an air of mystery to the manner of its operation.

Other objects and advantages will be apparent from the following description and the accompanying drawings forming a part hereof and in which Figure 1 is a rear view of an automobile showing the indicator attached thereto. Fig. 2 is a rear view of the indicator in "stop" position. Fig. 3 is a side view thereof. Fig. 4 is a rear view of the indicator in "go" position. Fig. 5 is a sectional view on line 5—5 of Fig. 2. Fig. 6 is an inverted view of Fig. 2.

Similar numerals and reference characters refer to similar parts throughout the several views.

The automobile A has the usual gasoline tank T at the rear thereof, and on this tank T the indicator 1 is fixed by means of bracket 2 being screwed to the tank. The rod 3, pivoting in bracket 2, is bent into a T formation 4 at its lower end, each arm of the T acting as a rotation stop for the rod 3 by striking against the bracket 2.

Fast to the top of rod 3, and rotating therewith are radial arms 5—5, 6—6, arms 5—5 preferably being made of one piece of material and 6—6 of another, with their angles being partly cut out and interlocked over rod 3 like the sections of a hinge over their pintle. Arms 5—5 are heavier than arms 6—6, either because made of heavier material or because weighted, but it is desirable to have them appear symmetrical, so that an air of mystery will surround the operation of the indicator.

Stops 4 permit the indicator to turn through an angle of substantially 90 degrees. When the automobile starts from rest, heavy arms 5—5 are urged, by the forward acceleration of the car, one to move to its farthest back position, in respect to the pivot, and the other to move back as far as stop 4 will admit, which is fixed to let the arm come to a substantial right angle to the direction of acceleration of the car.

When the car stops, the backward acceleration given it causes first the heavy arm which had been at right angles to the direction of forward acceleration to move forward, pointing opposite to the direction of the new acceleration, and this and the new acceleration pulls the other heavy arm 5 around to substantially a right angle to the direction of the acceleration, where it is again limited by the other end of stop 4 striking bracket 2.

In each instance the rigidly attached lighter arms 6—6 follow along with the movements of the heavier arms. They also make uniform the air and wind resistance to the movement of the heavier arms. The words Go—Go are on opposite arms, and Stop—Stop on the other opposite pair, so that the motorist in the rear may know what movement the front driver is giving his car, thus the rear driver may go or stop and avoid collisions and delay, he being informed by the indicator of the movements of the car in advance.

Many changes and modifications may be made in my new indicator without departing from the spirit of my invention, therefore, I intend not to be limited to the structure shown, but what I claim as new and desire to secure by Letters Patent is:

1. A movable body acceleration reversal indicator, comprising four right angular radially projecting arms horizontally rotatable on said body, two radially adjacent arms being heavier than their respective opposite arms, stops to limit the rotation of said arms, one when one heavy arm is at right angles to the direction of acceleration and another when the other heavy arm is at right angles to the direction of acceleration.

2. A movable body acceleration reversal indicator, comprising two right angular placed arms, rotatable horizontally at their intersection on said body, stops to limit the rotation of said arms to substantially 90 degrees, one stop when one arm is substantially parallel to the direction of acceleration and the other stop when the other arm is substantially parallel to the direction of acceleration.

3. A movable body acceleration reversal indicator, comprising two right angularly placed arms, rotatable horizontally at their intersection on said body, stops to limit the rotation of said arms to substantially 90 degrees, one stop when one arm is substantially parallel to the direction of acceleration and the other stop when the other arm is substantially parallel to the direction of acceleration, the arm at right angles to the direction of acceleration serving, in each instance, to begin the rotation of said arms upon a reversal of acceleration.

4. A movable body acceleration reversal indicator, comprising two right angularly placed arms, rotatable horizontally at their intersection on said body, stops to limit the rotation of said arms to substantially 90 degrees, one stop when one arm is substantially parallel to the direction of acceleration and the other stop when the other arm is substantially parallel to the direction of acceleration, the arm substantially parallel to the direction of acceleration pointing, with its free end, in each instance, in the opposite direction to that of the acceleration reversal.

HERBERT C. WEBB.